United States Patent [19]

Sato et al.

[11] Patent Number: 5,049,458
[45] Date of Patent: Sep. 17, 1991

[54] FUEL CELL

[75] Inventors: Yoshio Sato; Hirotaka Nakagawa; Hiroshi Mihara; Shigeyoshi Kosuge; Hiroshi Tsuneizumi; Eiji Morishige, all of Tokyo, Japan

[73] Assignee: NKK Corporation, Tokyo, Japan

[21] Appl. No.: 399,159

[22] Filed: Aug. 28, 1989

[30] Foreign Application Priority Data

Aug. 31, 1988 [JP] Japan ............................ 63-114482[U]
Jan. 30, 1989 [JP] Japan ............................. 1-009568[U]

[51] Int. Cl.$^5$ ........................ H01M 8/04; H01M 8/12
[52] U.S. Cl. ........................................ 429/32; 429/38; 429/39
[58] Field of Search ....................... 429/30, 32, 34, 35, 429/38, 39

[56] References Cited

U.S. PATENT DOCUMENTS

| 3,516,867 | 6/1970 | Dankese | 429/38 X |
| 3,746,578 | 7/1973 | Warszawski | 429/39 |
| 4,510,212 | 4/1985 | Fraioli | 429/30 |
| 4,649,091 | 3/1987 | McElroy | 429/34 |
| 4,753,857 | 6/1988 | Hosaka | 429/38 |
| 4,761,349 | 8/1988 | McPheeters et al. | 429/32 X |
| 4,855,193 | 8/1989 | McElroy | 429/30 |

FOREIGN PATENT DOCUMENTS 2514034 9/1976 Fed. Rep. of Germany ........ 429/30

OTHER PUBLICATIONS

Ceramic Electrochemical Reactors, compiled by Prof. Steele, Sep. 1987.

Primary Examiner—Stephen J. Kalafut
Attorney, Agent, or Firm—Frishauf, Holtz, Goodman & Woodward

[57] ABSTRACT

A fuel cell comprises at least two cell members, each of which has a flat-plate solid electrolyte having a fuel electrode layer on one surface thereof and an air electrode layer on the other surface thereof, separators, each of which is arranged between the cell members and comprises frame materials and metallic sheets having concave and convex portions and being coupled to the frame materials, a fuel supply path for supplying fuel and an air supply path for supplying air, a fuel discharge path for discharging fuel and an air exhaust path for exhausting air and collector members mounted on the outer sides of the separators of the highest and lowest stages.

Further, another fuel cell comprises at least two cell members, each of which has a flat-plate solid electrolyte layer on one surface thereof and an air electrode layer on the other surface thereof, metallic separators, each of which is arranged between the cell members and comprises a wave-form member, an upper flat-plate member and a lower flat-plate member, the wave-form member being put between the upper flat-plate member and the lower flat-plate member, a hole made in the upper flat-plate member for supplying fuel to the fuel electrode layer and a hole made in the lower flat-plate member for supplying air to the air cell member layer and a fuel supply path for supplying fuel and an air supply path for supplying air.

18 Claims, 8 Drawing Sheets

FUEL CELL

BACKGROUND OF THE INVENTION

1. Field of the Invention

The present invention relates to a solid electrolyte type fuel cell.

2. Description of the Prior Arts

As a flat-plate type solid electrolyte fuel cell, a flat-plate type solid electrolyte fuel cell as shown in FIG. 12 is pointed out.

Cell member 54 comprises solid elecrolyte layer 51, air electrode layer 52 formed on one side of said solid electrolyte layer 51 and fuel electrode layer 53 formed on the other side of said solid electrolyte layer 51. Distributers 55 are arranged on both electrode surfaces of said cell member 54. Said distributer 55 is made of metallic felt, metallic foaming body, ceramic felt, ceramic foaming body or the like, each of which has gas permeability, electrical conductivity, atmosphere resistance and cushioning property. Separators 56 are arranged on the outer sides of the distributers 55 so that separators 56 can press the distributers 55 to the electrode surfaces of the cell member 54. Separators 56 are electrically connected to one another, thereby an electrical circuit being formed. A space formed by the air electrode 52 and the separator 56 serves as an air path and a space formed by the fuel electrode 53 and the separator 56 as a fuel path. When the cell member 54 is practically used as a fuel cell, a fuel cell is constituted by stacking up the cell members 54 in a plurality of layers.

As another flat-plate type solid electrolyte fuel cell, a flat-plate type solid electrolyte fuel cell shown in FIG. 13 which Professor Steele introduced in his literature (CERAMIC ELECTROCHEMICAL REACTORS, 1987. B. C. H. Steele) is pointed out.

Cell member 69 comprises flat-plate solid electrolyte 66, flat-plate air electrode 67 formed on an upper surface of the solid electrolyte 66 and flat-plate fuel electrolyte 68 formed on a lower surface of the solid electrolyte 66. Fuel electrode 64 having fuel path 63 is formed on an upper surface of separator 65. Air electrode 62 having air path 61 is formed on a lower surface of the separator 65. The cell member 69 is put between two separators 65, each of which has the fuel electrode 64 and the air electrode 62. Air is supplied to the air path 61 enclosed with the air electrode 62 on the side of the separator and the air electrode 67 on the side of the cell member. Fuel is supplied to the fuel path 63 enclosed with the fuel electrode 64 on the side of the separator and the fuel electrode 68 on the side of the cell member. The separators 65 are electrically connected, via resistance 70 thereby an electrical circuit being formed. When a fuel cell is practically used, high voltage can be obtained by increasing the number of the cell members 69 and alternately putting the cell members 69 and the separators 65 one on another.

Further, monolithic type fuel cell shown in FIG. 14 which Professor Steele introduced is pointed out. Cell member 74 is constituted by arranging flat-plate fuel electrode 72, whose internal surface is constituted in the form of honey comb, on one surface of flat-plate solid electrolyte 71 and air electrode 73, whose internal surface is constituted in the form of honey comb, on the other surface of the flat-plate solid electrolyte 71. The fuel electrode 72 in the form of honey comb is mounted on the surface of the flat-plate solid electrolyte at right angles to the air electrode 73 in the form of honey comb. The cell members 74 are stacked up in layers by means of the separators 75. As shown in FIG. 15, fuel is supplied from fuel supply manifold 77 to honey comb space 76 of the fuel electrode 72 and excessive fuel is discharged from fuel discharge manifold 78. Air is supplied from air supply manifold 80 to honey comb space 79 of the air electrode 73 and excessive air is exhausted from air exhaust manifold 81.

There, however, have been the following problems in the above-mentioned flat-plate type solid electrolyte fuel cell:

(1) A type shown in FIG. 12:
①  In this fuel cell, manifolds for supplying fuel and air to the fuel cell are formed. O rings 57 are used for a gas seal of the manifolds. When O rings are strongly pressed to prevent gas from leaking, a cell portion of a thin film layer is liable to be broken.
②  Even if cushioning material such as Ni felt is introduced, the cell portion of a thin film layer has to carry a load invariably.
③  When the cell becomes larger, it is easy to break.

(2) A type of the fuel cell which Professor Steele proposed:
①  This type has no cushioning property. Therefore, when the cell is compressed, it is easy to break.
②  A structure of a tie-in portion of an external manifold becomes complicated.
③  In the case of monolithic cell type, the external manifold is hard to mount on a honey comb portion and there is a problem in the gas seal.

SUMMARY OF THE INVENTION

It is an object of the present invention to provide a flat-plate type solid electrolyte fuel cell which has a good cushioning property and a good gas seal property and can be adapted to an enlargement of the fuel cell.

To accomplish the above-mentioned object, the present invention provides a fuel cell comprising:

at least two cell members, each of which has a flat-plate solid electrolyte having a fuel electrode layer on one surface thereof and an air electrode layer on the other surface thereof;

separators, each of which is arranged between the cell members to stack up the cell members in layers and comprises frame materials and metallic sheets having concave and convex portions and being coupled to said frame materials, a separator of the highest stage being mounted on a cell member of the highest stage and a separator of the lowest stage being mounted on a cell member of the lowest stage;

a fuel supply path for supplying fuel to a space between the separator and the fuel electrode and an air supply path for supplying air to a space between the separator and the air electrode;

a fuel discharge path for discharging fuel from a space between the separator and the air electrode and an air exhaust path for exhausting air from a space between the separator and the air electrode; and collector members of electrical conductivity mounted on the outer sides of the separators of the highest and lowest stages.

Further, the present invention provides another fuel cell comprising:

at least two cell members, each of which has a flat-plate solid electrolyte having a fuel electrode layer on one surface thereof and an air electrode layer on the other surface thereof;

metallic separators, each of which is arranged between the cell members to stack up the cell members in layers and comprises a wave-form member, an upper flat-plate member and a lower flat-plate member, said wave-form member being put between the upper flat-plate member and the lower flat-plate member, a separator of the highest stage being mounted on a cell member of the highest stage and a separator of the lowest stage being mounted on a cell member of the lowest stage;

a hole made in the upper flat-plate member for supplying fuel to the fuel electrode layer and a hole made in the lower flat-plate member for supplying air to the air cell member layer; and a fuel supply path for supplying fuel to a space between the upper flat-plate member and the wave-form member and an air supply path for supplying air to a space between the lower flat-plate member and the wave-form member, said fuel being supplied from the fuel supply path to the fuel electrode layer through the hole made in the upper flat-plate member and said air being supplied from the air supply path to the air electrode layer through the hole made in the lower flat-plate member.

The above objects and other objects and advantages of the present invention will become apparent from the detailed description to follow, taken in connection with the appended drawings.

DESCRIPTION OF THE PREFERRED EMBODIMENT

Preferred Embodiment-1

Figure 1:
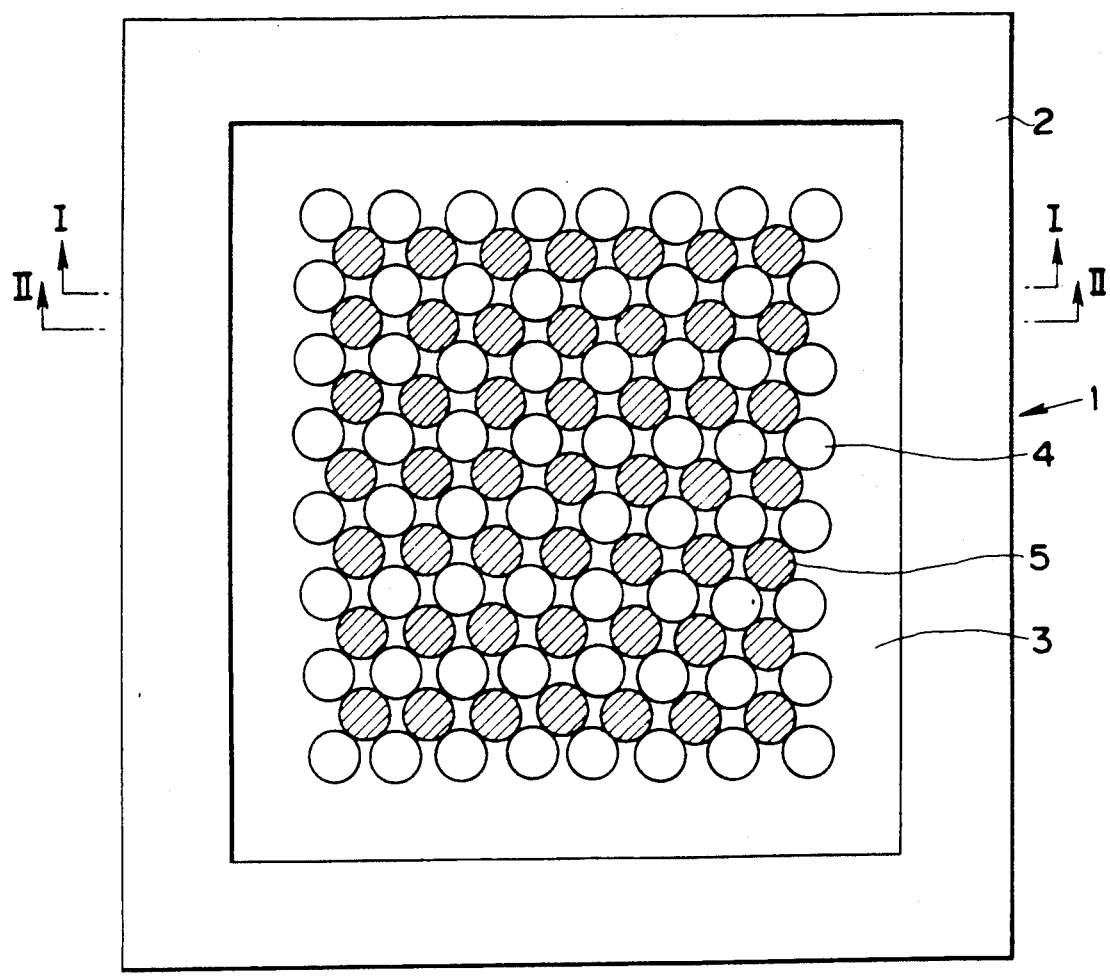
FIG. 1 is a top plan view illustrating a separator used for a fuel cell of Preferred Embodiment-1 of the present invention.
Figure 2:
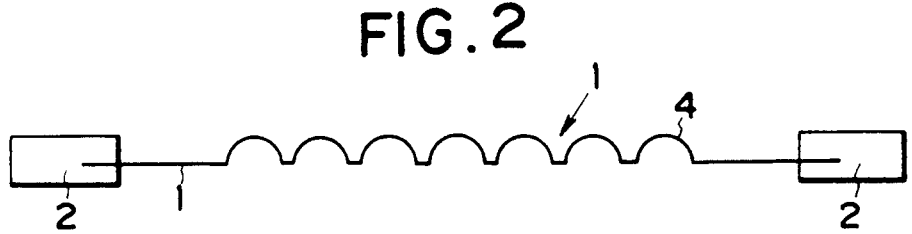
FIG. 2 is a sectional view of the separator taken on line 1—1 of FIG. 1.
Figure 3:
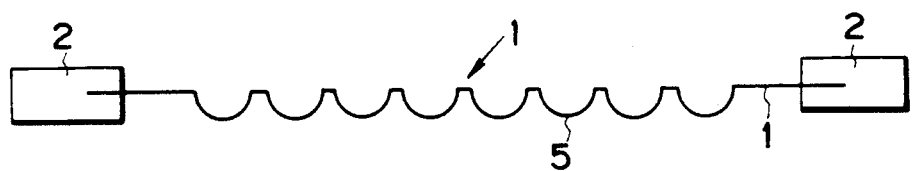
FIG. 3 is a sectional view of the separator taken on line 2—2 of FIG. 1.
Figure 4:
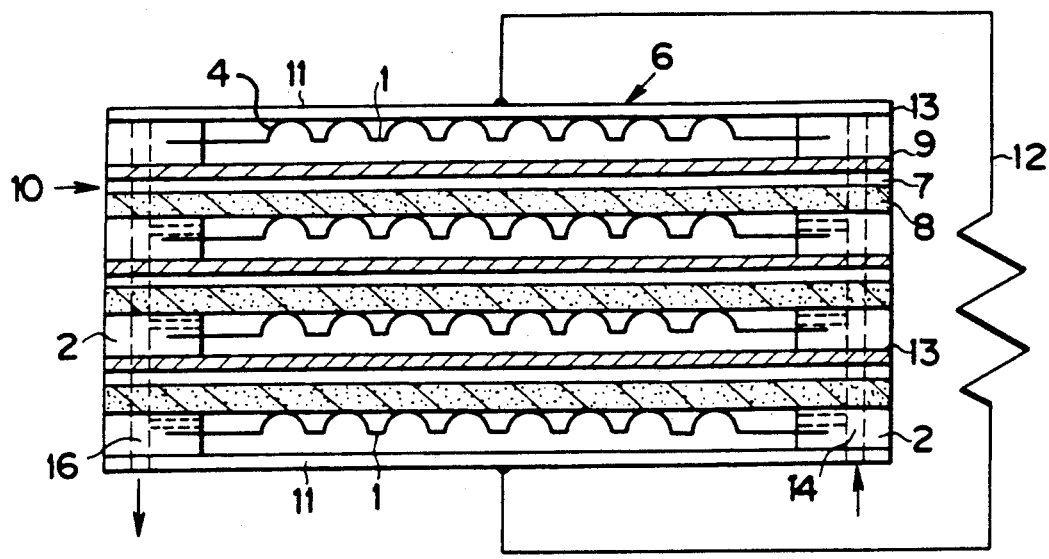
FIG. 4 is a sectional view illustrating the fuel cell of Preferred Embodiment-1 corresponding to the separator taken on line 1—1 of FIG. 1.
Figure 5:
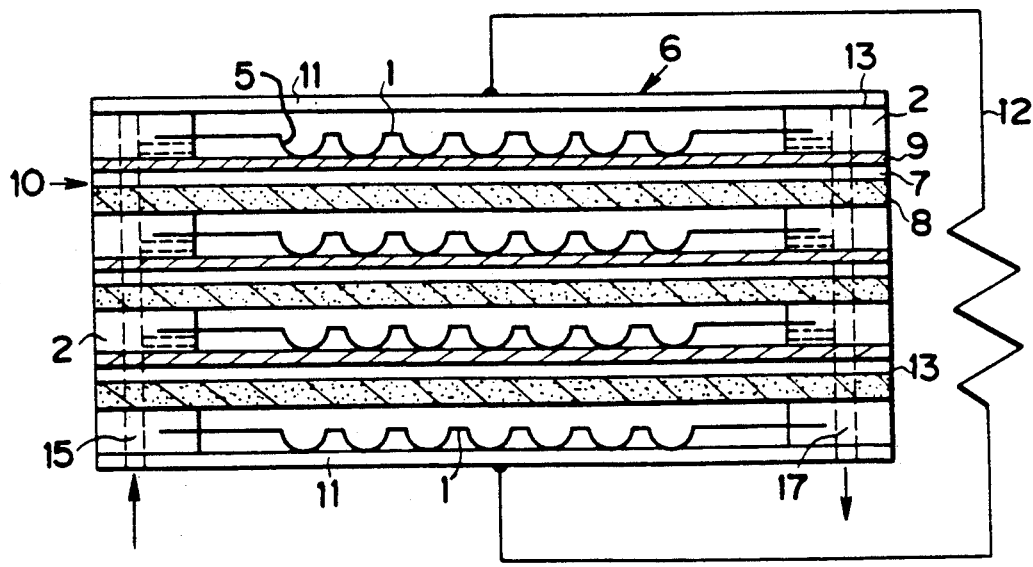
FIG. 5 is a sectional view illustrating the fuel cell of Preferred Embodiment-1 corresponding to the separator taken on line 2—2 of FIG. 1.

In the fuel cell of Preferred Embodiment-1 of the present invention, cell members, each of which has a flat-plate solid electrolyte having a fuel electrode on one surface thereof and an air electrode on the other surface thereof, are stacked up in layers by means of flat-plate separators, on each of which a number of concave and convex portions are arranged. Since the separator as a whole is flexible and the separator contacts surely the surface of the electrode in this fuel cell, there is no need for felt material and foaming body having electrical conductivity. Preferred Embodiment-1 of the present invention will be described with specific reference to FIGS. 1 to 5. As shown in FIG. 1, separator 1 used for the fuel cell is constituted with frame material 2 and sheet 3 of electrical conductivity, whose peripheral portion is fixed by the frame material 2, and which has a number of concave and convex portions. As shown in FIG. 1, the concave and convex portions of the sheet 3 are formed so that the concave portions (open circles) and convex portions (hatched circles) can be regularly arranged. Accordingly, in a sectional view of the fuel cell taken on line 1—1, only the convex portions 4 are regularly arranged as shown in FIG. 2. In a sectional view of the fuel cell taken on line 2—2, only the concave portions 5 are regularly arranged as shown in FIG. 3. The rows of convex portions 4 are in alignment with each other, as are the rows of concave portions 5. However, the rows of convex portions 4 are staggered relative to the rows of concave portions 5. Alloys good in high-temperature atmosphere resistance such as Ni-Cr-Fe alloy and Ni-Cr alloy are used for the separator 1. If necessary, the surface of the separator 1 can be coated with ceramic material such as lanthanum-manganese oxide and lanthanum cobalt oxide doped with strontium oxide by means of a vapor deposition method or the like. A solid electrolyte type fuel cell, for which the separator 1 is used, is shown in FIGS. 4 and 5. In the solid electrolyte fuel cell 6, cell members 10 of three-layer structure having solid electrolyte sheet 7, fuel electrode 8 on the underside of the solid electrolyte 7 and air electrode 9 on the upside of the solid electrolyte 7 and said separator 1 are alternately stacked up in layers. Further, collector materials 11 having electrical conductivity are arranged on the outer sides of the separators 1 of the lowest and highest stages. In Preferred Embodiment-1 of the present invention, three cell members and four separators are used. Electrical circuit 12 is formed by electrically connecting collector materials 11. The convex portions 4 of the separator 1 contact only the fuel electrode 8 as shown in FIG. 4. The concave portions 5 of the separator 1 contact only the air electrode 9 as shown in FIG. 5. The concave and convex portions of the separator have a depth large enough for the lowest point of a concave portion to contact the upper surface of the cell member and for the highest point of a convex portion to contact the lower surface of the cell member. Gas seal 13 is arranged on the portions of frame material 2 of the separator 1 where the separator 1 contacts the cell member 10 and the collector material 11 so that gas and air cannot leak. In this fuel cell, fuel path 14 and air path 15 are arranged. Fuel is supplied to a space formed by the fuel electrode 8 and the separator 1 through the fuel path 14 and air to a space formed by the air electrode 9 and the separator 1. Excessive fuel and air are discharged from fuel discharge path 16 and air exhaust path 17. Since the separators having a number of concave and convex portions are used for the fuel cell of Preferred Embodiment of the present invention, the fuel cell has a good cushioning property and electrical conductivity. Moreover, the fuel cell does not require such distributors as felt material and foaming body. The fuel cell has a good gas permeability. Therefore, cost required for the distributors can be saved.

Preferred Embodiment-2

Figure 6:
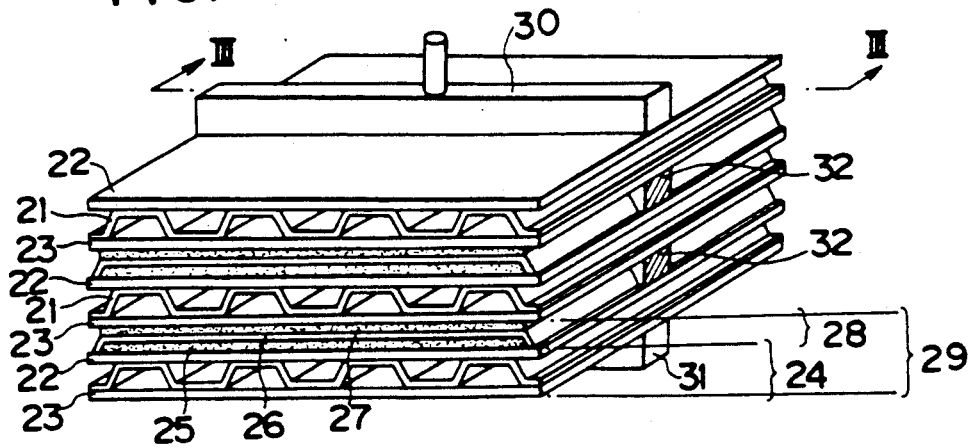
FIG. 6 is a perspective view showing a fuel cell of Preferred Embodiment-2 of the present invention.
Figure 7:
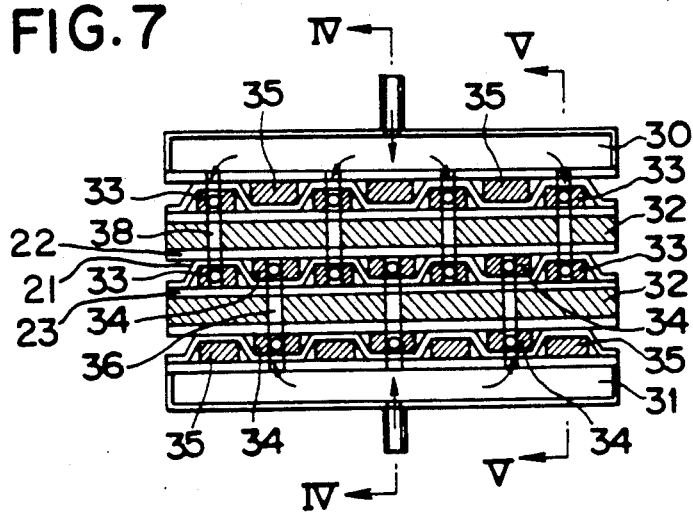
FIG. 7 is a sectional view showing the fuel cell taken on line 3—3 of FIG. 6.
Figure 8:
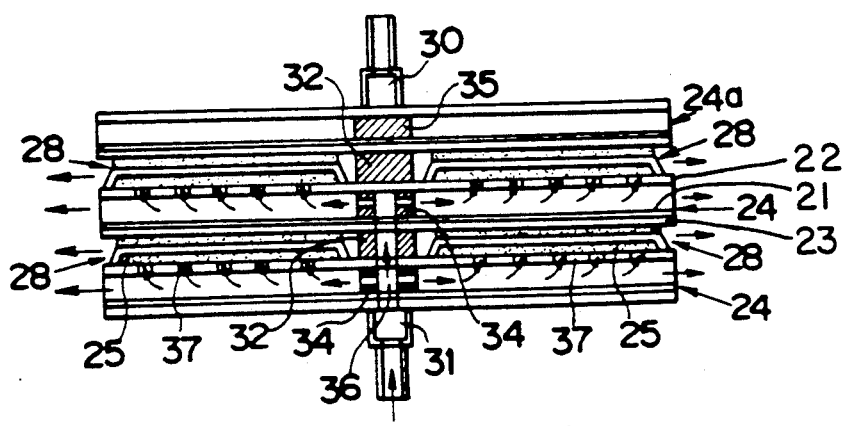
FIG. 8 is a sectional view showing the fuel cell taken on line 4—4 of FIG. 7.
Figure 9:
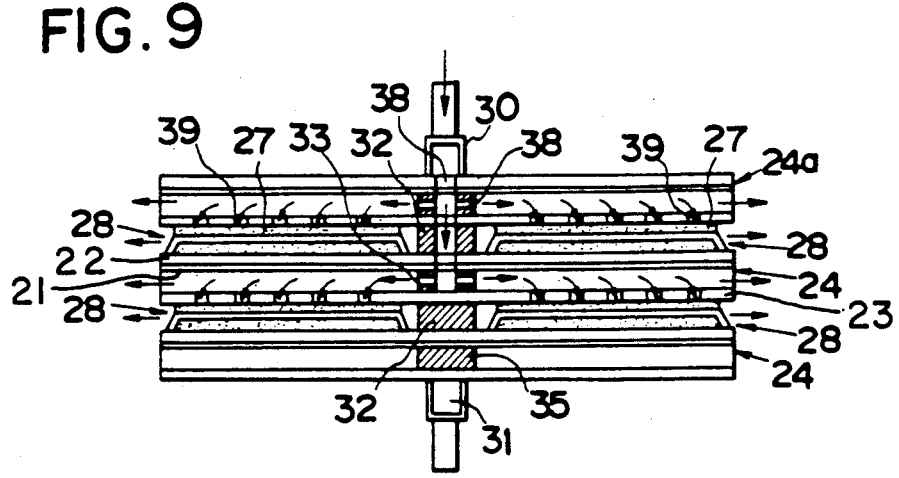
FIG. 9 is a sectional view showing the fuel cell taken on line 5—5 of FIG. 7.
Figure 10:
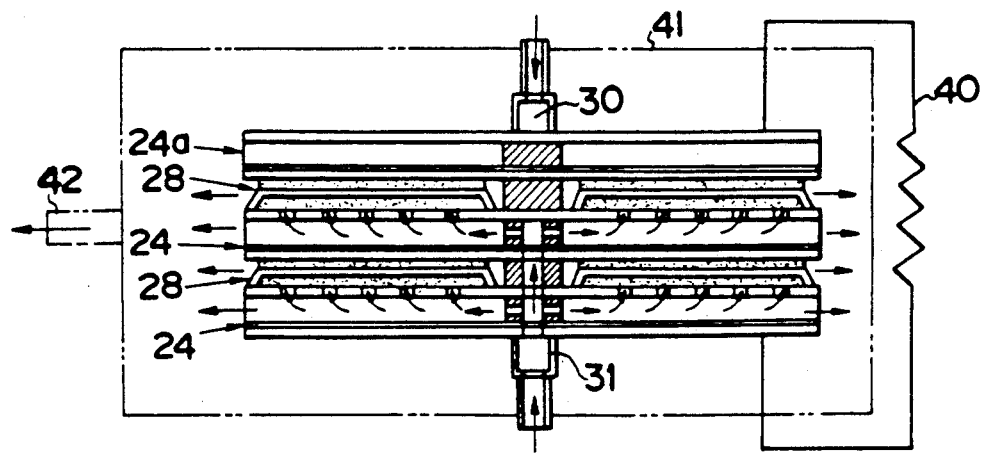
FIG. 10 is an explanatory view designating a state of the use of the fuel cell of Preferred Embodiment-2 of the present invention.
Figure 11:
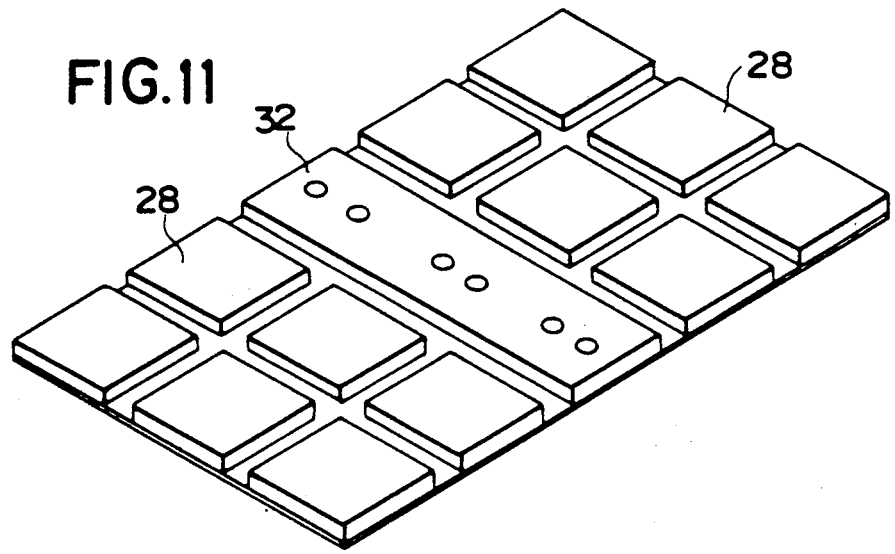
FIG. 11 is a perspective view designating a method of forming a cell member pertinent to Preferred Embodiment-2 of the present invention.
Figure 12:
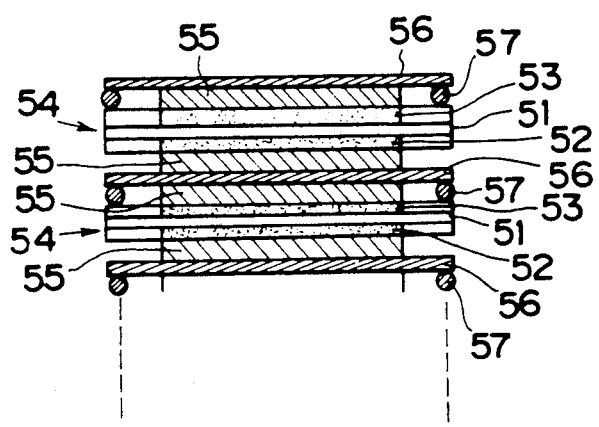
FIG. 12 is a sectional view designating a prior art solid electrolyte fuel cell, for which flat-plate separators are used.
Figure 13:
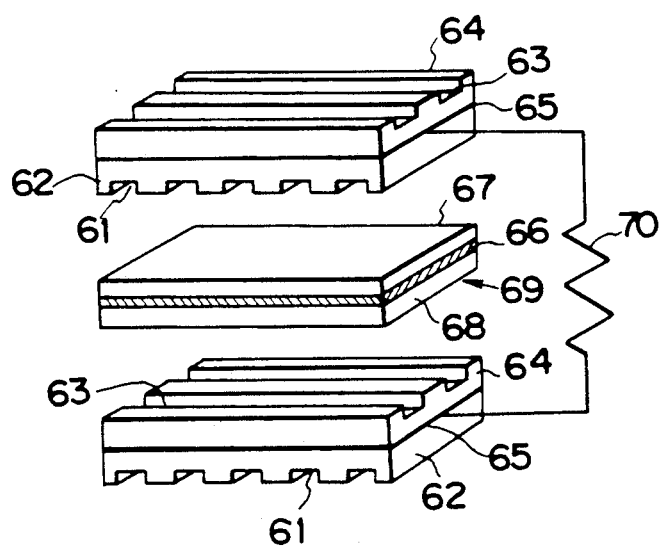
FIG. 13 is a sectional view illustrating another prior art solid electrolyte fuel cell, for which separators having grooves are used.
Figure 14:
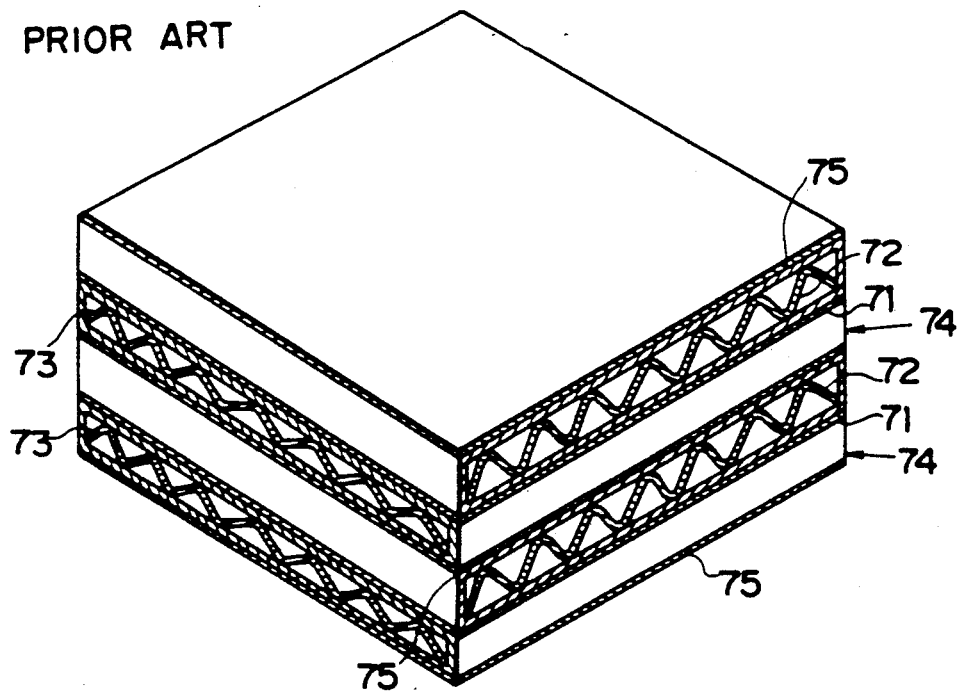
FIG. 14 is a perspective view illustrating furthermore prior art solid electrolyte fuel cell wherein a fuel cell and an air electrode have a honey comb structure, respectively.
Figure 15:
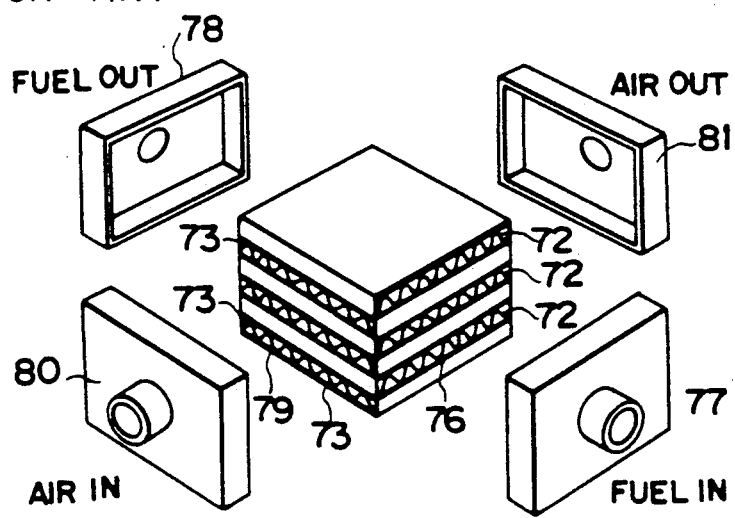
FIG. 15 is an explanatory view designating how fuel supply manifolds and air supply manifolds are mounted on the electrolyte fuel cell of FIG. 14.

A fuel cell of Preferred Embodiment-2 of the present invention will be described with specific reference to FIGS. 6 to 11. FIG. 6 is a perspective view illustrating a structure of a flat-plate type solid electrolyte fuel cell of Preferred Embodiment-2 of the present invention. The flat-plate type solid electrolyte fuel cell is made by stacking up cells 29 in a plurality of layers. Each of the cells 29 comprises metallic separator 24 and cell member 28. The metallic separator 24 comprises wave-form member 21, upper flat-plate member 22 and lower flat-plate member 23. The wave-form member 21 is put between the upper flat-plate member 22 and the lower flat-plate member 23. The cell member 28 comprises fuel electrode 25, solid electrolyte 26 and air electrode 27. Film layers of the fuel electrode 25, solid electrolyte 26 and air electrode 27 are formed in this order on the upper flat-plate member 22 of the separator 24. Only the separator 24a is arranged on the highest stage. Air supply manifold 30 is mounted on the separator 24a. At the same time, fuel supply manifold 31 is arranged on the underside of the separator of the lowest stage. The cell member 24 is divided into two portions on upper flat-plate member 22. Fuel paths and air paths are formed in divided portions. A spacer 32 used for increasing a gas seal property of internal manifolds is arranged over the whole width of the separator 24. FIG. 7 is a sectional view showing the fuel cell taken on line 3—3 of FIG. 6. As clearly seen from FIG. 7, air supply spacer 33, fuel supply spacer 34 and spacer 35 are arranged in the central portion of the separator 24 corresponding to the portion where the spacer 32 is arranged. FIG. 8 is a sectional view showing the fuel cell taken on line 4—4 of FIG. 7. FIG. 8 designates a fuel supply path. The fuel supply path 36 is a path passing through upper flat-plate member 22, lower flat-plate member 23, wave-form member 21, spacer 34 arranged between the wave-form member 21 and the upper flat-plate member 22 and the spacer 32 arranged between the upper flat-plate member 22 and the lower flat-plate member 23. Fuel flows from fuel supply manifold 31 to fuel supply spacer 34 through the fuel supply path 36 arranged in the lower flat-plate member 23 on the underside of the separator 24 and arranged in the wave-form member 21 of the separator 24. Some portion of the fuel flows in a wave-form space of the separator 24 and reaches fuel electrode 25 through through hole 37 arranged in the upper flat-plate member 22 of the separator 24. Then, some portion of the fuel flows to the fuel electrode 25 on the next stage through through hole 37 arranged in the upper flat-plate member 22 of the separator 24. Excessive fuel is evaporated from the sides of the separator 24 and the cell member 28. Members blocking the sides of the separator 24 and the cell member 28, of course, can be arranged. FIG. 9 is a sectional view showing the fuel cell taken on line 5—5 of FIG. 7. FIG. 9 designates an air supply path. The air supply path is a path passing through upper flat-plate member 22, lower flat-plate member 23, wave-form member 21, spacer 33 arranged between the wave-form member 21 and the lower flat-plate member 23 and spacer 32 arranged between the upper flat-plate member 22 and the lower flat-plate member 23. Air flows from air supply manifold 30 to air supply spacer 33 through air supply path 38 arranged in upper flat-plate member 22 of the separator 24a and in wave-form member 21 of the separator 24a. Some portion of the air flows in a wave-form space of the separator 24 and flows to air electrode 27 through through hole 39 arranged in the lower flat-plate member 23 on the underside of the separator 24a. Some portion of the air flows to air electrode 27 on the next stage through each spacer. Excessive fuel is discharged from the sides of the separator 24 and the cell member 28. FIG. 10 is an explanatory view showing a structure of the fuel cell in the case of the practical use of the fuel cell. Electrical circuit 40 is constituted by electrically connecting the separators on the upper and lower ends of the above-mentioned flat-plate type solid electrolyte fuel cell, which is put into container 41 as shown with a dashed line and used so that excessive fuel, air and cell reaction products can be discharged from discharge hole 42. The order, in which the fuel electrode, solid electrolyte and the like are stacked up in layers in the cell member, is not confined to the order in Preferred Embodiment of the present invention. The order can be any order with the solid electrolyte as the center which is reverse to the order in the Preferred Embodiment. The method for forming the cell member is not limited to the method for forming film layers as in the Preferred Embodiment. The fuel electrode, solid electrolyte and the like which are formed separately can be inserted into the cell member. Further, the cell member can be divided not only into two portions as in the Preferred Embodiment, but also into a plurality of portions as shown in FIG. 11. In the Preferred Embodiment the wave-form member of the separator was described by the use of a deck-plate type member which is typically a sheet corrugated with a squarish wave corner, two examples of which are depicted in FIG. 18. FIG. 18 also shows a keystone-plate type and a corrugated plate type of members which likewise can be used for the wave-form member. Other types of wave-form members can be used if they have the requisite cushioning property and gas seal property.

The fuel cell of Preferred Embodiment-2 of the present invention is good in cushioning property for the reason as described below:

(a) A metallic separator constituted by putting it between the upper wave-form member and the lower wave-form member is used.
(b) Cells, in each of which cell members, each comprising fuel electrode, solid electrolyte and air electrode with the solid electrolyte as the center, is fixed on said metallic separator, are stacked up in a plurality of layers.

Further, since the portion of the internal manifold constituted by a wave-form portion and two flat-plate members of the metallic separator have a structure such that said portion is fixed by arranging the spacers made of the same material as the separator or insulating material, said portion enables a cell portion to have a cushioning property and simultaneously to have a good gas seal property. Since the metallic separator serves as a strength member, the fuel cell has a possibility of being enlarged.

EXAMPLE 1

| | | |
|---|---|---|
| Solid electrolyte | Yttria-stabilized zirconia (YSZ) | 100 cm$^2$ |
| Fuel electrode | NiO—YSZ cermet | 100 cm$^2$ |
| Air electrode | La (Sr) MnO$_3$ | 100 cm$^2$ |
| Separator | | |
| Plate | Inconel 600 or Ni—Cr | |
| Frame material | Inconel 600 or Ni—Cr | |
| Form of concave portion | semi-circular | |
| Form of convex portion | semi-circular | |
| Collector material | Inconel 600 or Ni—Cr | |

Figure 16:
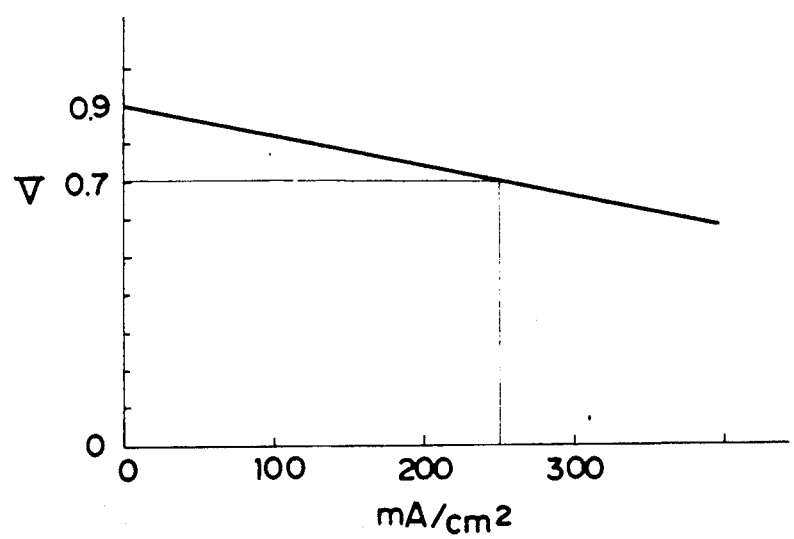
FIG. 16 is graphical representation designating the relation between electrical current and voltage which is a result of Example-1.

FIG. 16 is a graphical representation showing the relation between electrical current and voltage which is a result of a test of Example-1. In the case of the use of H$_2$ at 1 l/min. and air at 10 l/min., voltage corresponding to 250 mA/cm$^2$ was 0.7 V.

EXAMPLE 2

| | | |
|---|---|---|
| Solid electrolyte | Yttria-stabilized zirconia (YSZ) | 100 cm$^2$ |
| Fuel electrode | NiO—YSZ cermet | 100 cm$^2$ |
| Air electrode | La (Sr) MnO$_3$ | 100 cm$^2$ |
| Separator | | |
| Upper flat-plate member | Inconel 600 or Ni—Cr | |
| Lower flat-plate member | Inconel 600 or Ni—Cr | |
| Wave-form member | Inconel 600 or Ni—Cr | |
| Spacer | Alumina | |
| Manifold | Inconel 600 | |

Figure 17:
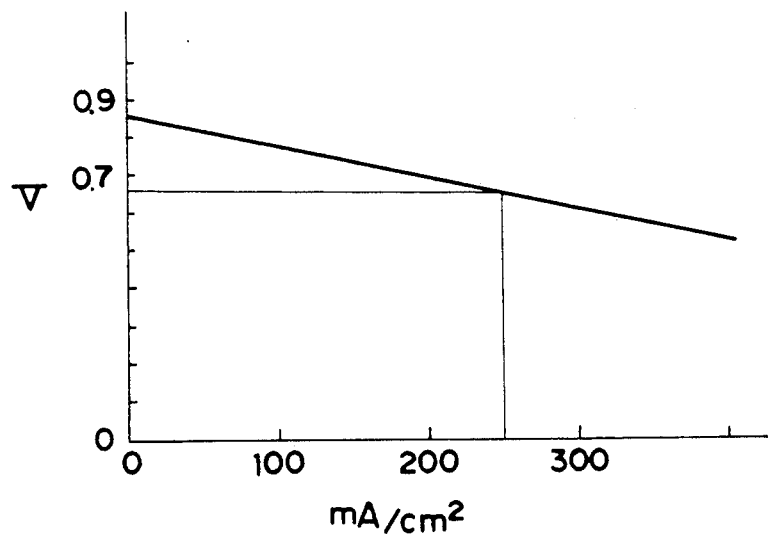
FIG. 17 is a graphical representation designating the relation between electrical current and voltage which is a result of Example-2.
Figure 18A:
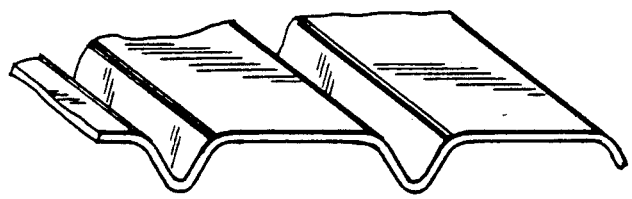
FIG. 18 is a perspective view of three types of shapes usable for the wave-form member.
Figure 18B:
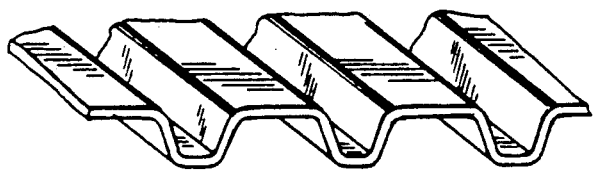
Figure 18C:
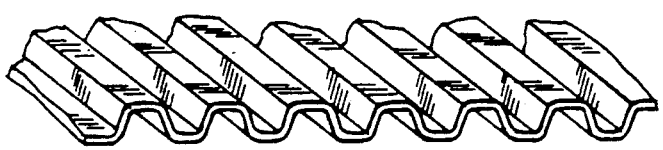
Figure 18D:
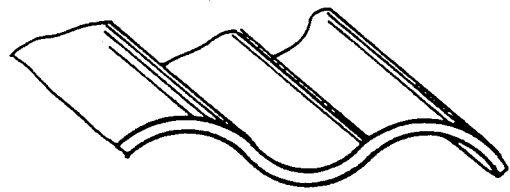
Figure 18E:
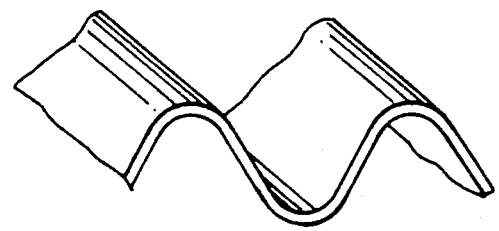

FIG. 17 is a graphical representation showing the relation between electrical current and voltage.

In the case of the use of H$_2$ at 1 l/min. and air at 10 l/min., voltage corresponding to 250 mA/cm$^2$ was 0.7 V.

What is claimed is:

1. A fuel cell comprising:
   at least two cell members, each of which has a flat-plate solid electrolyte having a fuel electrode layer on one surface thereof and an air electrode layer on the other surface thereof;
   a plurality of separators, each of which is arranged between a pair of said cell members to stack up the cell members in layers and comprises a frame and a metallic sheet coupled to said frame, said metallic sheet having an array of first portions projecting from said sheet and intermingled with an array of oppositely directed second portions projecting from said sheet, said separators including a highest stage separator and a lowest stage separator, said highest stage separator being mounted on a cell member of the highest stage in said stack and said lowest stage separator being mounted under a cell member of the lowest stage in said stack;
   a fuel supply path for supplying fuel to a space between at least some of said separators and adjacent respective fuel electrode layers, and an air supply path for supplying air to a space between at least some of said separators and adjacent respective air electrode layers;
   a fuel discharge path for discharging fuel from said space between said separators and adjacent respective fuel electrode layers, and an air exhaust path for exhausting air from said space between said separators and adjacent respective air electrode layers; and
   electrically conductive collector members respectively mounted on outer sides of said highest and lowest stage separators.

2. The fuel cell of claim 1, wherein said first portions of said separator each have a depth large enough for the lowest point of the first portions to contact an upper surface of an adjacent cell member and said second portions of said separator each have a height large enough for the highest point of the second portions to contact a lower surface of an adjacent cell member.

3. The fuel cell of claim 1, wherein said separator has a coated layer of ceramic material on the surface thereof.

4. A fuel cell comprising:
   at least two cell members, each of which has a flat-plate solid electrolyte having a fuel electrode layer on one surface thereof and an air electrode layer on the other surface thereof;
   metallic separators, each of which is arranged between the cell members to stack up the electrode members in layers and comprises a wave-form member, an upper flat-plate member and a lower flat-plate member, said wave-form member being put between the upper flat-plate member and the lower flat-plate member, a separator of the highest stage being mounted on a cell member of the highest stage and a separator of the lowest stage being mounted under a cell member of the lowest stage;
   a hole made in the upper flat-plate member for supplying fuel to the fuel electrode layer and a hole made in the lower flat-plate member for supplying air to the air cell member layer; and
   a fuel supply path for supplying fuel to a space between the upper flat-plate member and the wave-form member and an air supply path for supplying air to a space between the lower flat-plate member and the wave-form member, said fuel being supplied from the fuel supply path to the fuel electrode layer through the hole made in the upper flat-plate member and said air being supplied from the air supply path to the air electrode layer through the hole made in the lower flat-plate member.

5. The fuel cell of claim 4, wherein said wave-form member is one selected from the group of deck-plate corrugated and keystone members.

6. The fuel cell of claim 4, wherein said air supply path is a path passing through the upper flat-plate member, lower flat-plate member, wave-form member, spacer arranged between the wave-form member and the lower flat-plate member and the spacer arranged between the upper-flat-plate member and the lower flat-plate member.

7. The fuel cell of claim 4, wherein said fuel supply path is a path passing through the upper flat-plate member, lower flat-plate member, wave-form member, spacer arranged between the wave-form member and the upper flat-plate member and the spacer arranged between the upper flat-plate member and the lower flat-plate member.

8. The fuel cell of claim 4, which further comprises an air supply manifold for supplying air to the air supply path and a fuel supply manifold for supplying fuel to the fuel supply path.

9. The fuel cell of claim 1, wherein said arrays of the first and second portions comprise at least one row of a plurality of said first portions and at least one row of a plurality of said second portions.

10. The fuel cell of claim 9, wherein said intermingled arrays of the first and second portions comprise alternating rows thereof.

11. The fuel cell of claim 10, wherein said alternating rows of the first and second portions are staggered.

12. The fuel cell of claim 11, wherein said first and second portions extend substantially perpendicular to said sheet.

13. The fuel cell of claim 12, wherein said first and second portions are substantially semi-spherical.

14. The fuel cell of claim 1, wherein said first and second portions extend substantially perpendicular to said sheet.

15. The fuel cell of claim 14, wherein said first and second portions are substantially semi-spherical.

16. The fuel cell of claim 9, wherein said at least one row of the first portions is staggered relative to the at least one row of said second portions.

17. The fuel cell of claim 1, wherein said separators comprise a layer of Ni-Cr alloy, and a coating layer on said Ni-Cr alloy layer of lanthanum-manganese oxide which is doped with strontium oxide.

18. The fuel cell of claim 1, wherein said separators comprise a layer of Ni-Cr-Fe alloy, and a coating layer on said Ni-Cr-Fe alloy layer of lanthanum-manganese oxide which is doped with strontium oxide.

* * * * *